United States Patent [19]

Pugsley

[11] 4,025,189

[45] May 24, 1977

[54] PREPARATION OF HALF-TONE IMAGES

[75] Inventor: Peter C. Pugsley, Pinner, England

[73] Assignee: Crosfield Electronics Limited, London, England

[22] Filed: Dec. 16, 1974

[21] Appl. No.: 533,460

[30] Foreign Application Priority Data

Dec. 17, 1973 United Kingdom ............ 58324/73

[52] U.S. Cl. .................................. 355/38; 355/50; 355/68; 355/70; 355/71

[51] Int. Cl.² ......................................... G03B 27/78

[58] Field of Search ................. 355/53, 68, 71, 70, 355/50, 38, 40, 46, 83, 84, 86, 69

[56] References Cited

UNITED STATES PATENTS

| | | | |
|---|---|---|---|
| 3,479,119 | 11/1969 | Miller et al. | 355/70 X |
| 3,506,352 | 4/1970 | Denner | 355/68 |
| 3,542,470 | 11/1970 | Ost | 355/68 |
| 3,545,858 | 12/1970 | Childers | 355/68 |
| 3,746,446 | 7/1973 | Sliwkowski | 355/68 |
| 3,868,183 | 2/1975 | Childers | 355/68 |

Primary Examiner—Richard A. Wintercorn
Attorney, Agent, or Firm—Kemon, Palmer & Estabrook

[57] ABSTRACT

Apparatus for reproducing a half-tone image of an original comprises a support, preferably in the form of a cylinder, for a light-sensitive record medium, an exposing head for exposing a record medium on the support, and means preferably in the form of a mechanism for rotating the cylinder and a lead screw for moving the head axially of the cylinder, to produce a relative scanning motion between the exposing head and the record medium. The exposing head includes a row of side-by-side light modulators or light sources extending in a direction such that the areas illuminated by the modulators or sources on the record medium extend in a direction across the width of a scanning line on the record medium. The area of illumination of the record medium provided by each light modulator or source varies in the said direction and is of lower intensity at its ends than at its middle and each area overlaps the areas of illumination provided by adjacent modulators or sources. Illumination control means are provided responsive to the density variations of the original, which is also scanned, and to the desired half-tone screen pattern and this control means is operative to determine which light source units are to be illuminated and to select the intensity of illumination of at least any illuminated light modulator or source adjacent an unilluminated light modulator or source.

7 Claims, 17 Drawing Figures

PREPARATION OF HALF-TONE IMAGES

In one method of reproducing a half-tone image of an original, the half-tone effect is produced by means of a scanning exposing head having a row of light source units exposing a row of elements extending across the width of scanning line on a record medium. Switching signals for varying the number of illuminated units, and therefore the length of the illuminated segment or segments in the row, are computed from the picture signal and from signals such as would be produced by scanning a vignetted contact screen at a finer resolution than that used for picture scanning. Each light source unit of the exposing head, when illuminated, generates light which is of substantially constant intensity across the width of the line portion covered by that unit, so that if all units of the row are illuminated, uniform intensity of illumination is obtained across the line width. If a half-tone screen dot is symmetrically placed with respect to the scanning line, one or more central light source units will be illuminated throughout the period in which the row of light source units moves past the required dot area and other light source units will be switched on and off independently, as required, at each end of a segment of illuminated unit in the row. When the required dot area cuts the lateral margin of the scanning line, the segment of illuminated units will not be centrally located in the row of light source units but will be to one side and in some cases in a single scanning line of the record medium there may be two segments of illuminated elements, the width of each of which varies incrementally. Typically there are six elements to the scanning line, the number being limited by the expense and complexity of the resulting optical system. There is thus a practical limit on the number of gradation steps of dot size obtainable in this method of "half-tone screening" without distorting the dot shapes and positions in a manner which is detrimental to the ease of printing and to the freedom from visible patterning of the finished result.

The present invention departs from the concept of using sources which uniformly illuminate discrete areas of the surface to be exposed.

According to the present invention, apparatus for reproducing a half-tone image of an original comprises: a support for a light-sensitive record medium, an exposing head for exposing a record medium when placed on the support, and means for obtaining a relative scanning motion between the exposing head and the record medium, the exposing head including a row of light source units extending in a direction such that the corresponding illuminated areas of the record medium extend in a direction across the width of a scanning line on the record medium, the area of illumination of the record medium provided by each light source unit varying in the said direction so as to be of lower intensity at its ends than at its middle and overlapping the areas of illumination provided by adjacent light source units; and illumination control means responsive to the density variations of the scanned original and to the desired half-tone screen pattern, and operative to determine which light source units are to be illuminated and to select the intensity of illumination of at least and illuminated light source unit adjacent and unilluminated light source unit.

The advantage of varying the illumination intensity of an illuminated unit adjacent an unilluminated unit when the intensity distribution is as defined above is that such variation permits the rate of decrease of light intensity with distance from the last fully illuminated unit to be adjusted. When there is a threshold of response in the reproduction process, such as when the record medium to be exposed is a lithographic film having a response threshold, the progressive variation of illumination intensity of an illuminated unit at the end of a segment of illuminated units progressively adjusts the length of the line which will print at this portion of the required dot area. In other words, the invention permits the length of such a line to be adjusted continuously instead of incrementally. Thus, a substantially continuous variation in dot size becomes possible.

Each light source unit may consist of a light source, such as a light-emitting diode, or may include a modulator and a laser, the laser being common to all the modulators.

Adjoining light source units reinforce one another in their overlapping illuminated area, the light intensity falling off at the end of a line of illumination, adjacent an unilluminated light source unit, where the surface to be exposed is illuminated by one end light source unit only. Preferably, the intensity profiles of the light source units are such as to give a constant illumination level along the line between their peak individual illuminations.

In order that the invention may be better understood, some examples of methods an apparatus embodying the invention will now be described with reference to the accompanying drawings, in which.

Figure 1:
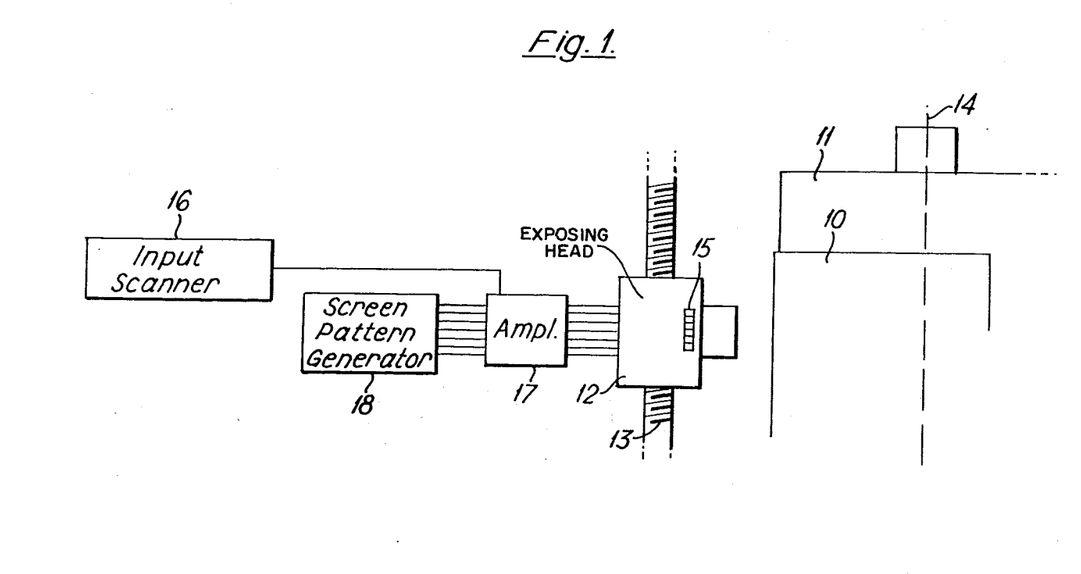
FIG. 1 shows diagrammatically apparatus embodying the invention.

In FIG. 1, a light-sensitive sheet 10 mounted on a cylinder 11 is scanned by an exposing head 12 mounted on a lead screw 13. Relative scanning motion is achieved by rotating the cylinder about its axis 14 and rotating the lead screw 13 to cause the exposing head 12 to move along the lead screw in a direction paralled to, the cylinder axis. The rotation of the lead screw 13 is slow in relation to the rotation of the cylinder, so that a succession of axially spaced circumferential lines are scanned on the light-sensitive sheet 10 wrapped around the cylinder 11. The exposing head 12 comprises a row of side-by-side light modulators or light sources 15. The total width of the strip of light projected on to the light-sensitive surface 10 is equal to the width of the required scanning line. Thus, in the example shown, the scanning line is broken up transversely into six side-by-side areas. To control the light output of the light sources or modulators 15, signals from an input scanner 16, which may be of conventional form, are applied to an amplifier 17. These scanner signals are common to all the light sources or modulators. A screen pattern generator 18 generates signals which together represent the density profile of a half-tone screen over the width of the scanning line. A suitable input scanner is shown in FIG. 1 of U.S. Pat. No. 3,541,242. An arrangement suitable for the screen pattern generator 18 is shown in British Pat. No. 1,294,363.

Figure 2A:
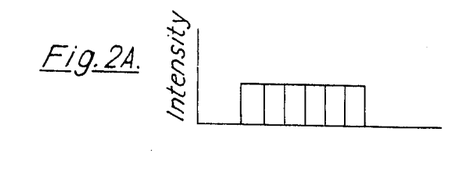
FIGS. 2A and 2B illustrate the intensity profiles of known light sources in a multi-element light output head and the intensity profiles of light sources in an apparatus embodying the present invention.
Figure 2B:
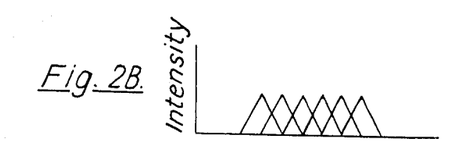

In FIG. 2A, there is shown the intensity profile of side-by-side light sources in known arrangements. In such arrangements, each light source has a substantially constant intensity over the area that it illuminates, and there is no overlap between adjacent illuminated areas. Each of these rectangular-profile sources can be switched on and off independently, so that by switching on and off the last illuminated source in a segment of illuminated sources (or the last two or three illuminated sources in the segment) the length of the illuminated line can be varied. FIG. 2B shows the corresponding intensity profiles obtained with one form of apparatus embodying the present invention. Each illuminated area has a triangular intensity profile and the sources or modulators are so located that each illuminated area overlaps adjacent areas by one half of the area width. The combined intensity profile gives a substantially constant illumination in the overlapping areas, but the intensity reduces to zero in a continuous manner at the ends of an illuminated segment.

Figure 3A:
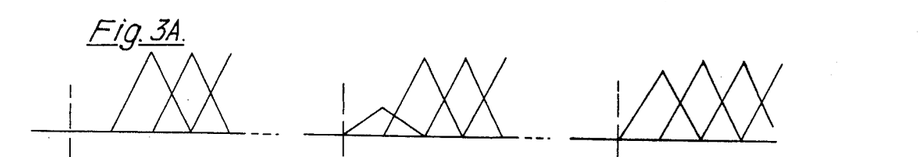
FIGS. 3A, 3B and 3C illustrate the intensity profile for a segment of a line with different illumination intensities for the end light source unit of the segment of illuminated light source units, together with the corresponding combined intensity profiles and the resulting film images.
Figure 3B:
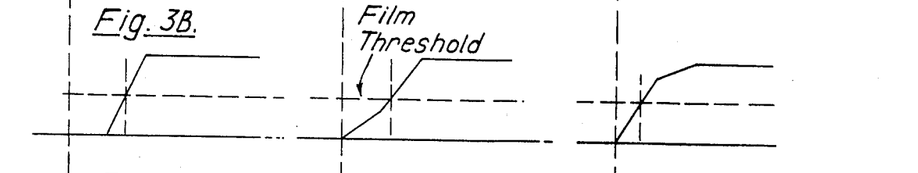
Figure 3C:
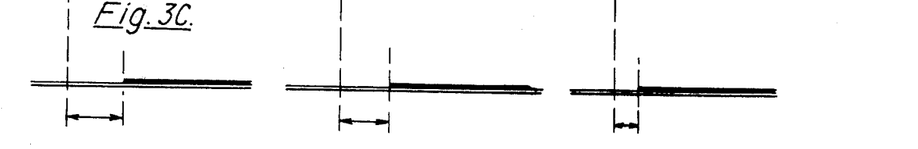

FIG. 3A shows three intensity profiles for an area illuminated by the light source or modulator at one end of a row of such sources or modulators. In the left-hand diagram, the source or modulator to the left of the last fully illuminated source or modulator is at zero intensity whilst in the remaining two diagrams it has an intermediate intensity. FIG. 3B shows the combined intensity profiles for the individual intensity profiles of FIG. 3A, the film sensitivity threshold being superimposed in dotted lines on these diagrams. FIG 3C indicates the extent of the image dot areas on the film which result from illumination, the dot areas commencing where the combined profile line of FIG. 3B crosses the film threshold. It will be seen that by controlling the intensity of the last source or modulator in a continuous manner, a continuous variation of image dot dimension can be achieved.

Figure 4:
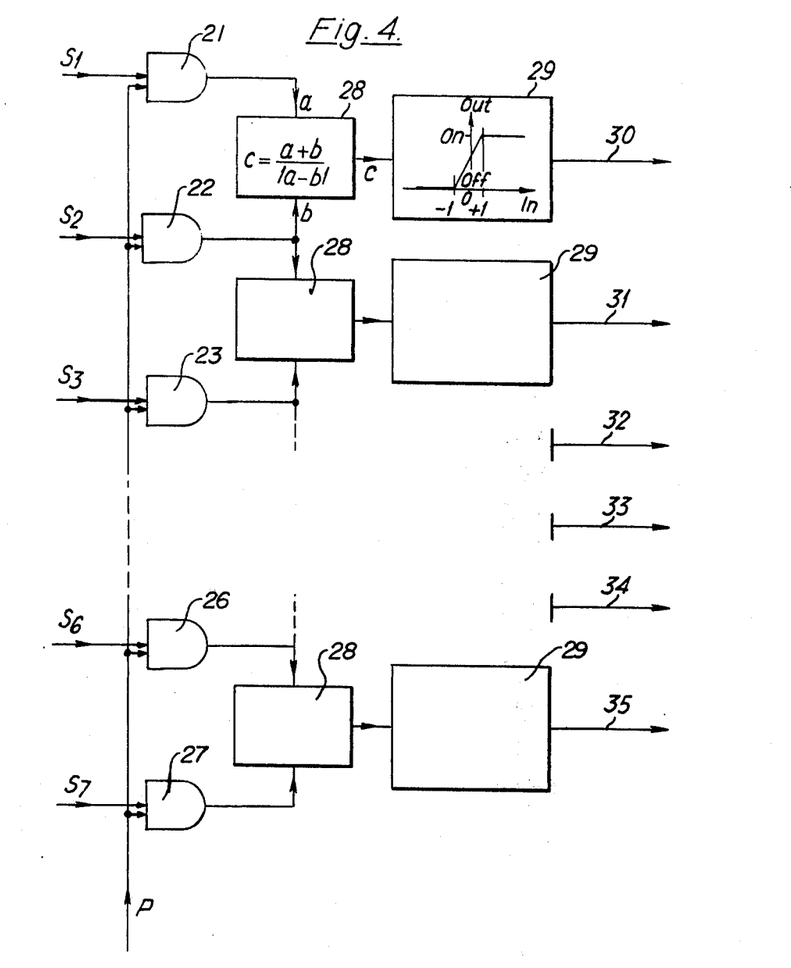
FIG. 4 is a block diagram of a circuit for controlling the light source unit intensities.

A control system suitable for use in apparatus embodying the present invention is shown in FIG. 4. In FIG. 4, lines S1 and S7 represent signals from an electronic screen generator and are such as would be produced by scanning a conventional vignetted screen at a resolution which, in this example, is six times finer than the picture resolution. Each pair of adjacent signals combine to provide an output signal for one head source and consequently seven signals are necessary to control the six head sources. Signal S1 repeats the sequence followed by signal S7 on the previous revolution.

In FIG. 4, signal P is the picture signal, applied to each of the summing junctions 21 to 27. The relative levels of picture signal and screen signal are so chosen that the switch between black and white corresponds to the change of sign of (P + S).

The characteristics of the subsequent computing blocks 28 and 29 are shown in the diagram. Conventional analogue computing elements may be chosen to realise these. Each ouput head element is controlled by two adjacent (P + S) signals in such a manner that if both signals are of the same sign, the element is either fully on or fully off, while if they are of different signs the element is partially switched. Thus in FIG. 4, the outputs from summing elements 21 and 22 are represented by $a$ and $b$ and the function generating circuit 28 provides a signal $c$ given by the formula $$c = a + b / |a - b|$$

When $a$ and $b$ are of the same polarity, $|a - b|$ must always be positive and less than $(a + b)$; therefore the resultant $c$ is greater then 1 but may be positive or negative. When $a$ and $b$ are of opposite polarities, $|a - b|$ must always be positive and greater than $(a + b)$. Consequently the resultant $c$ then lies between +1 and −1. The signal $c$ is then applied to the control amplifer 29 which drives the light source. It will be clear that the resultant $c$ is obtained by adding signals $a$ and $b$, obtaining the absolute value of $(a - b)$, and dividing the first signal by the second. Circuits for adding and subtracting signals are given in FIGS. 4.7 and 4.8.$a$, pages 60 to 63, of "Operational Amplifiers" by G. B. Clayton, published by Butterworths in 1971. An absolute value circuit (with inversion) is given in "Operational Amplifiers", edited by Graeme, Tobey and Huelsman and the staff or Burr-Brown Research Corporation, published by McGraw Hill (1971) in FIG. 7.15.$a$, pages 247–250. The latter publication also shows divider circuits on pages 268 and 269. An alternative divider circuit, more suitable for the present application, is given in a Data Sheet published by Motorola Semi Conductor Products Incorporated, for the multiplier device MC 1595L and MC 1495L, in which FIG. 25 shows how the multiplier device is connected to perform a dividing function; this example includes inversion of one signal. The characteristics of this are as sketched in block 29. With $a$ and $b$ both negative (i.e., a "black" value at both ends of the elemental area corresponding to the light source element in question) and therefore with an input signal $c$ which is −1, or more negative than this, the light is off. With a and b both positive (i.e., a "white" value at both ends of the elemental area) and therefore with an input $c$ which is +1, or more positive than this, the light is fully on. With a positive value at one end and a negative value at the other end of the elemental area, and therefore with a signal $c$ between −1 and +1, the light is turned on by a proportional amount. The block 29 generating the non-linear function may take the form of the function generator shown in FIG. 7.13, page 248, of "Operational Amplifiers", edited by Graeme, Tobey and Huelsman and the staff of Burr-Brown Research Corporation, published by McGraw Hill (1971). The signals on lines 30 to 35 control the six light sources or modulators. The result is a flat-topped intensity distribution except at the ends of the illuminated segment.

It is also possible to omit units 28 and 29 and to reduce the number of screen-representing signals and summing junctions to six and to connect the outputs of the summing junctions directly to the light source element control circuits. If the values of the screen-representing signals correspond to a sinusoidal screen intensity distribution, the result will be a sinusoidal variation in the amount of exposing light across the dot area to be exposed.

Figure 5A:
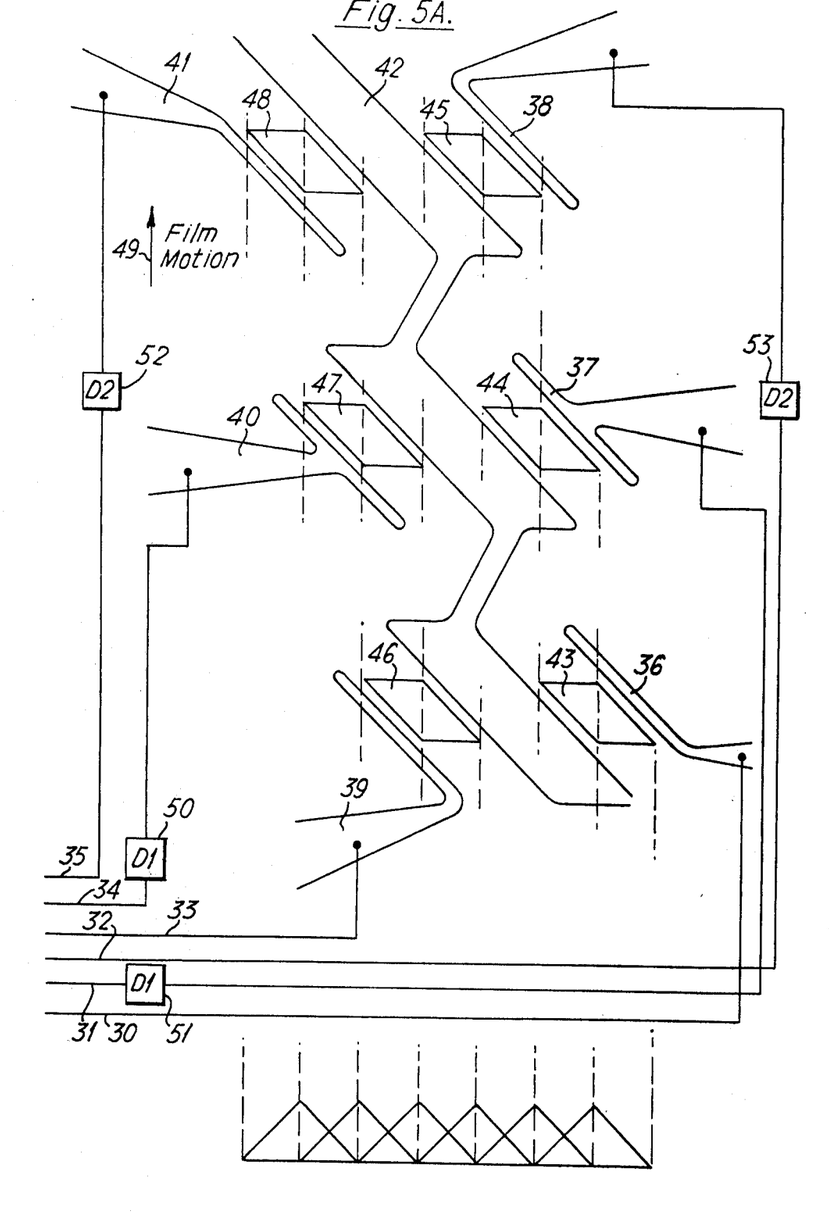
FIGS. 5A and 5B illustrate modulator systems for controlling the intensities of the light source units.
Figure 5B:
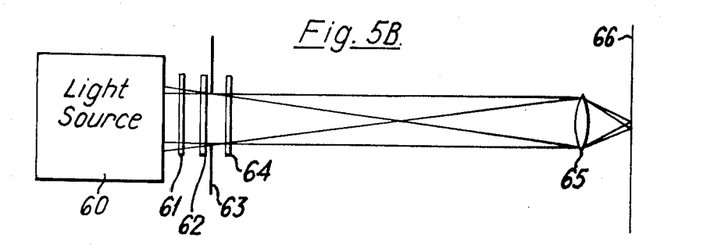

The light source units can take any of a number of forms. FIGS. 5A and 5B illustrate a light modulator and a system employing such a modulator. In this case the modulator uses an electro-optic material known as PLZT. When a thin slice of such a material is subjected to a transverse electric field between electrodes it exhibits a quadratic electro-optic effect and when placed between crossed polarisers it can control the transmission of light.

FIG. 5A shows greatly enlarged a modulator which can be used with incoherent light sources but which has a particular advantage when used with a coherent light source. The modulator has six signal electrodes 36 to 41 respectively controlled by signals from the lines 30 to 35 of FIG. 4. A common electrode 42 of the shape shown is so positioned with respect to each signal electrode that an electric field is established between them. Between the common electrode and the signal electrodes 36 to 41 are respective "windows" 43 to 48 of the electro-optical material PLZT formed by depositing a mask of non-conducting material on PLZT between the electrodes. The direction of film motion in relation to the electrode assembly is shown by the arrow 49. Light passes through the modulators in a direction perpendicular to the plane of the paper to expose the film. The PLZT windows are staggered, as shown, in the direction of the line scanning and also spaced in a direction transverse to the line scanning direction. They are shaped to produce at any point on the film during its motion past the modulator a light input which has a triangular profile (see FIG. 2B) in a direction transverse to the line scanning direction. To ensure that the six signals which are simultaneously present on lines 30 to 35 result in six side-by-side exposed areas, signals on lines 30 and 33 are applied directly to the signal electrodes 36 and 39, signals on lines 31 and 34 are applied to signal electrodes 37 and 40 through respective delay circuits 50 and 51 which provide one unit of delay, and signals on lines 32 and 35 are applied to signal electrodes 38 and 41 through respective delay circuits 52 and 53 which provide two units of delay.

Although the form of modulator shown in FIG. 5A with staggered modulator sections is an advantageous form with other light sources, its use in conjunction with the delay circuits has a particular advantage when the light source is a laser common to all the modulators. Overlapping of simultaneous coherent light beams at the film surface would result in interference. By arranging that adjacent light modulators illuminate the film successively interference in the overlapping areas is avoided.

FIG. 5B illustrates an optical system using a PLZT modulator; in this case, the light source unit 60 includes a conventional incoherent light source and a condenser lens. Light from the source 60 passes through a polariser 61, a PLZT modulator 62, a stop 63 defining the working area of the modulator and a polariser 64 before being focussed by a lens 65 on to the film 66 to be exposed.

Figure 6A:
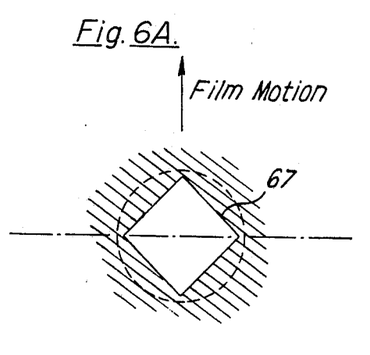
FIGS. 6A, 6B and 6C illustrate the shape of a lens stop in relation to a line of light source units, and the effect of the stop on the superimposed areas of illumination.
Figure 6B:
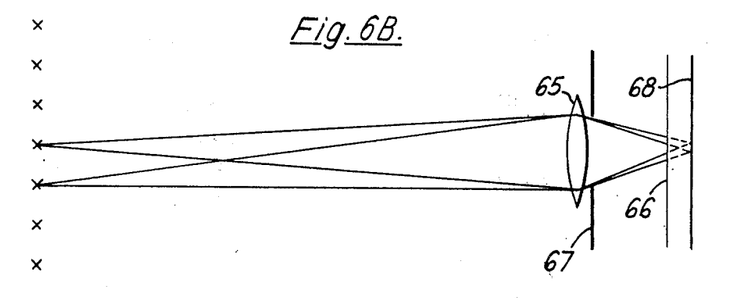
Figure 6C:
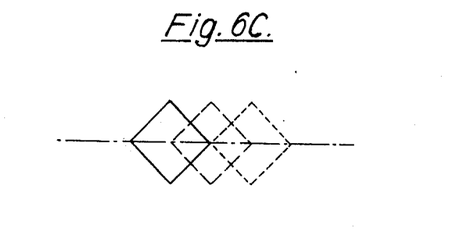

In the arrangement shown in FIGS. 6A–6C, point light sources, such as crater lamps, separately modulated laser beams or light-emitting diodes, provide light which reaches the film 66 after passing through the lens 65 and a diamond-shaped stop 67 (see FIGS. 6A and 6B). The image plane is indicated by the dotted line 68, and it will be seen that the lens is defocussed at the film plane so that the light spreads out into a diamond shaped patch of substantially uniform illumination. These patches are spaced in the manner shown in FIG. 6C. When integrated by the scanning motion, the required light input profile to the film is obtained.

Figure 7A:
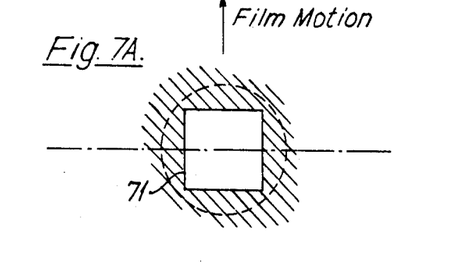
FIGS. 7A, 7B and 7C illustrate the use of an auxiliary lens of cylindrical form in apparatus embodying the invention.
Figure 7B:
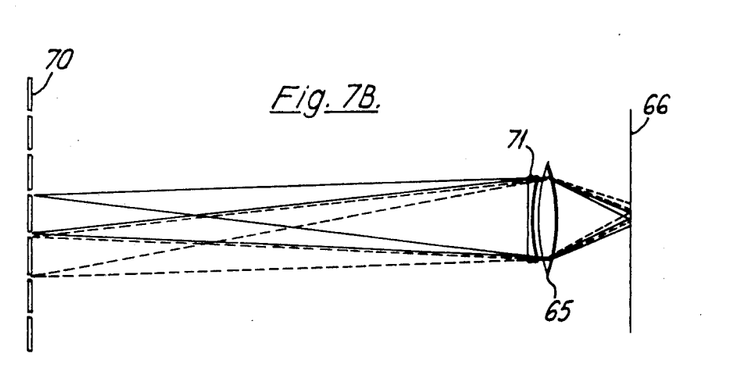
Figure 7C:
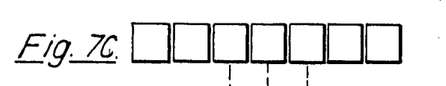
Figure 7D:
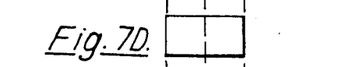
Figure 7E:
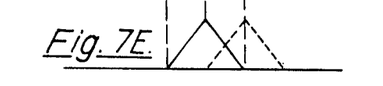

In yet another arrangement, illustrated in FIGS. 7A to 7C, large-area light-emitting diodes 70 are used as sources. These diodes are approximately square and are placed as nearly contiguous as is convenient. In this case, the diodes are imaged on to the film 66 through a lens with a square aperture (see FIG. 7A). The image is defocussed in the direction along the row by an auxiliary cylindrical lens 71, which may be positive or negative. FIG. 7C shows the light sources as imaged without the cylindrical lens and FIG. 7D shows the image of a single source imaged with the cylindrical lens, the degree of defocussing being adjusted to double the image spread, so that the spread images of alternate sources just meet. FIG. 7E illustrates the intensity profile of the spread image. The cylindrical lens may be omitted if the main lens is defocussed to the same extent but this introduces an undesirable defocussing in the direction of the scanning lines.

I claim:

1. Image reproducing apparatus comprising: exposure control means including an exposing head for exposing a light-sensitive record medium and means for obtaining relative line and frame scanning motion between the exposure head and the record medium, whereby the record medium is exposed along successive scanning lines, the exposing head including a row of light source units arranged to illuminate respective part-line areas of the record medium which together extend across the width of a scanning line of the record medium; the exposure control means further comprising, for producing a half-tone screened image or colour separation of an original in response jointly to an image density representing electric signal obtained by photoelectrically scanning the original and signals derived from a screen pattern generator and representing the variations of half-tone screen density across the scanning line, illumination control means including an illumination control device for each light source unit, the illumination control devices being responsive in common to the image-density representing signal and individually responsive to the signals from the screen pattern generator, whereby a single series or two series of adjacent light source units in the row is illuminated, the number of illuminated light source units in a series varying with the amplitudes of the said signals;

each light source unit providing at the record medium an area of illumination which is of lower intensity at its ends than at its middle and which overlaps the areas of illumination provided by adjacent light source units; and the illumination control means further comprises means controlling in accordance with the said image-density representing signals and screen-density representing signals the intensity of illumination of at least one illuminated light source unit adjacent any unilluminated light source unit, any intermediate illuminated light source units in the said series remaining at a predetermined intensity.

2. Apparatus in accordance with claim 1, including means whereby adjacent light source units, when required to expose overlapping areas of the record medium, are illuminated at different times.

3. Apparatus in accordance with claim 2, in which each light source unit includes a modulator and each modulator derives its light from a common laser.

4. Apparatus in accordance with claim 2, in which the modulators of all the light source units are formed by a composite electro-optic modulator including individual signal electrodes, adjacent signal electrodes being spaced in the direction of line scanning as well as in a direction transverse to the line scanning direction, the apparatus further including means for delaying the application of modulation control signals to selected ones of the modulators, so that simultaneous modulation control signals result in side-by-side and overlapping exposed areas on the record medium.

5. Apparatus in accordance with claim 1, in which each light source unit provides at the record medium an area of illumination having an illumination intensity profile such that the total illumination between the mid-points of the overlapping areas illuminated by adjacent ones of the fully-on light source units is substantially uniform.

6. Apparatus in accordance with claim 1, in which the illumination control means includes means for deriving composite signals representing the results of combining the image density for a scanned portion of the scanning line with respective screen pattern variations for a number of points across the scanning line equal to one more than the number of light source units, and control signal generating means for deriving from the said composite signals for each pair of adjacent points a control signal such that if both the composite signals are of the same polarity, the control signal switches the corresponding light source unit either fully on or fully off, while if the two composite signals are of different polarities the light source unit is partially illuminated.

7. Apparatus in accordance with claim 6, in which the control signal generating means generates a signal $c$ given by the expression:

$$c = a + b/|a - b|$$

in which $a$ and $b$ are the composite signals for adjacent points across the width of the scanning line.

* * * * *